UNITED STATES PATENT OFFICE.

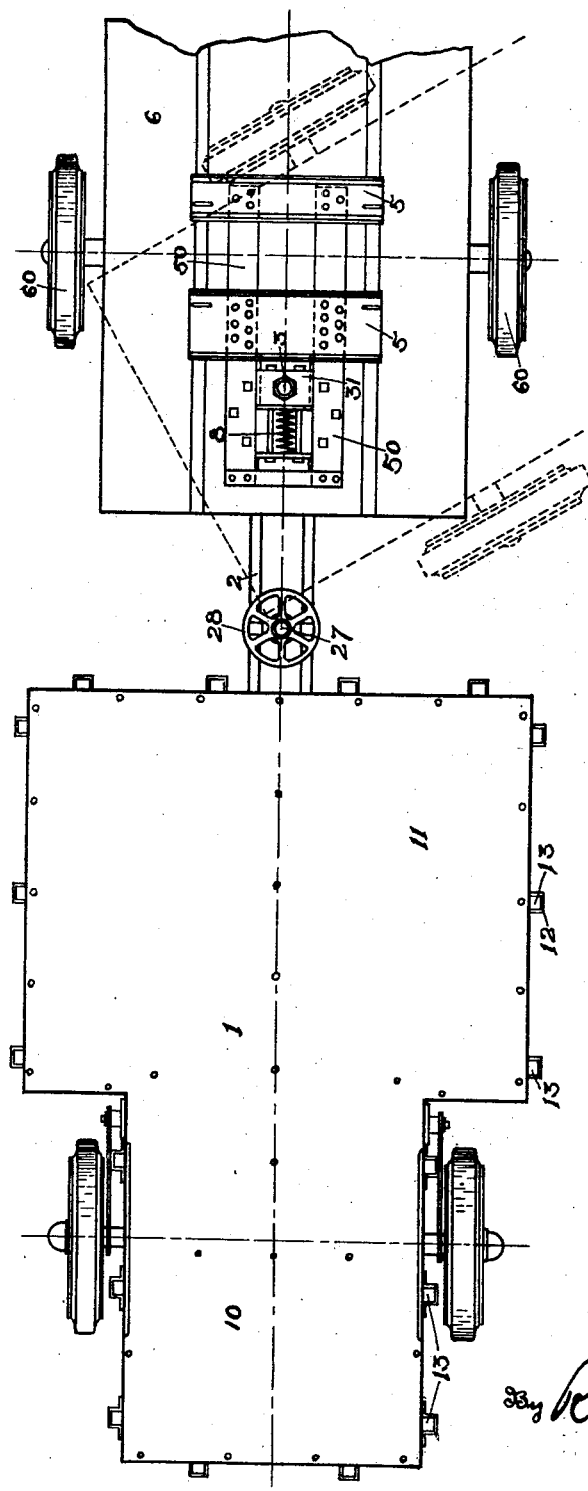

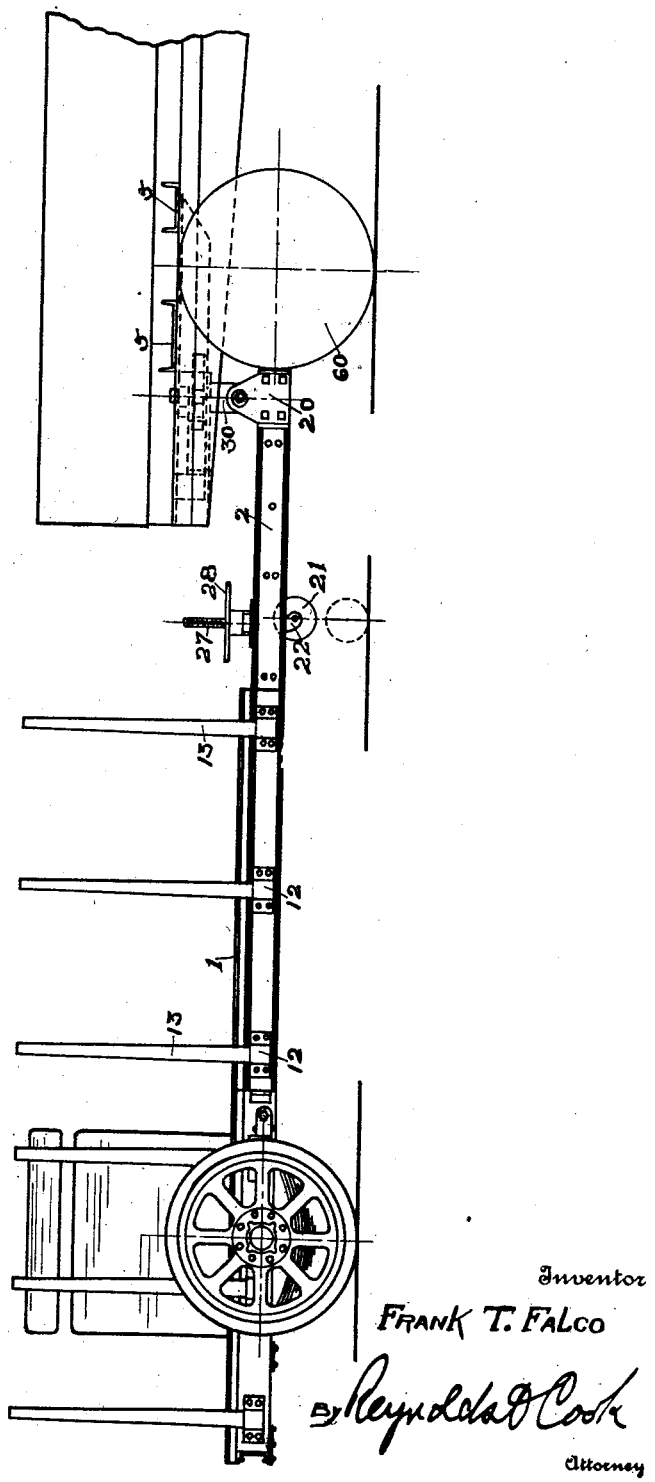

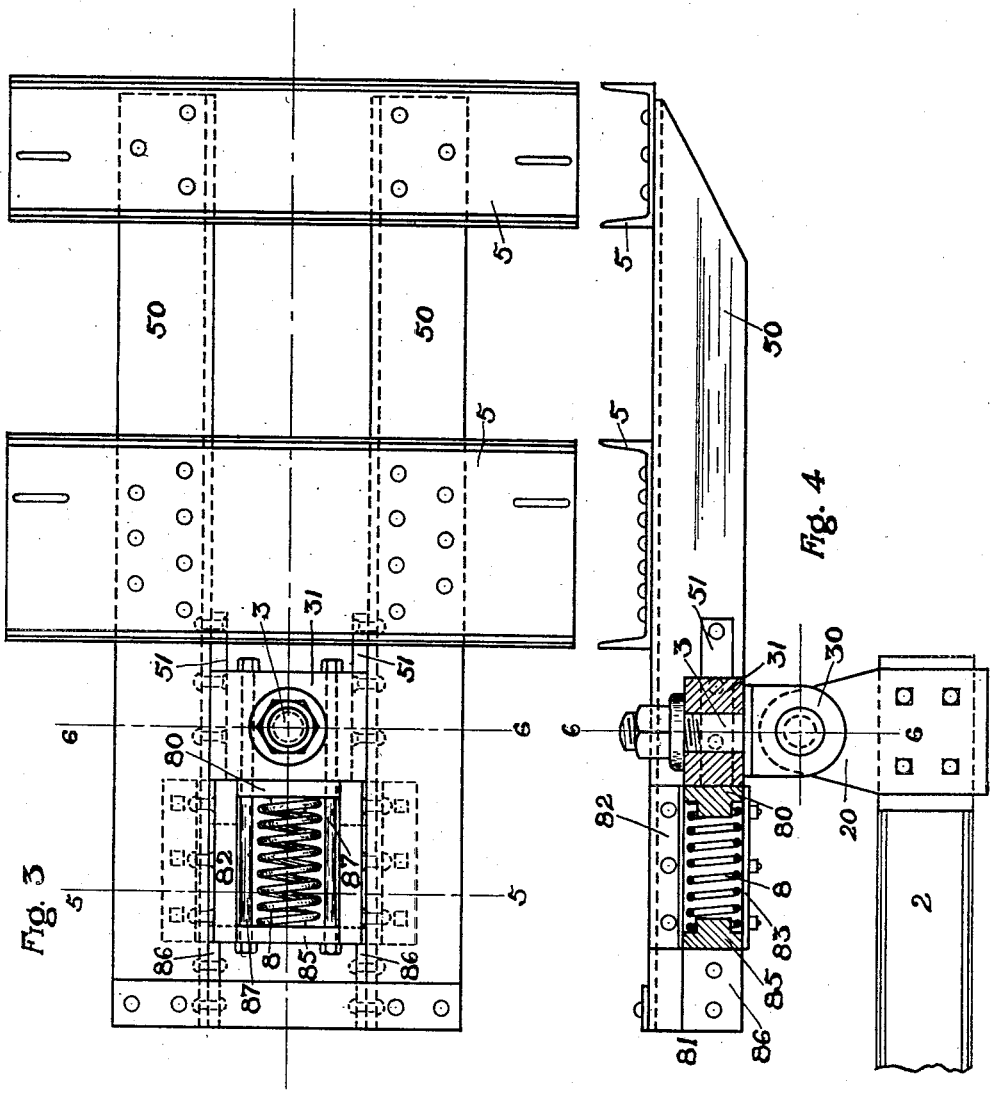

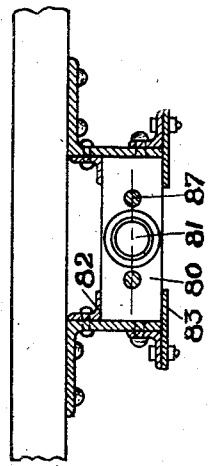
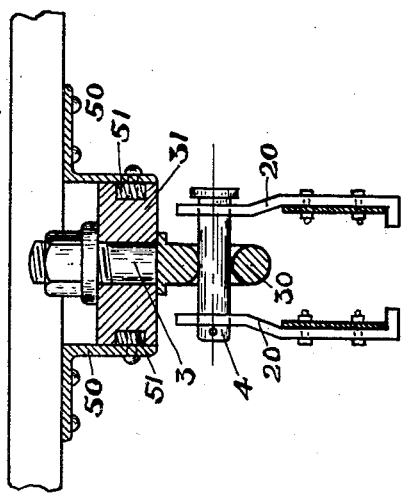
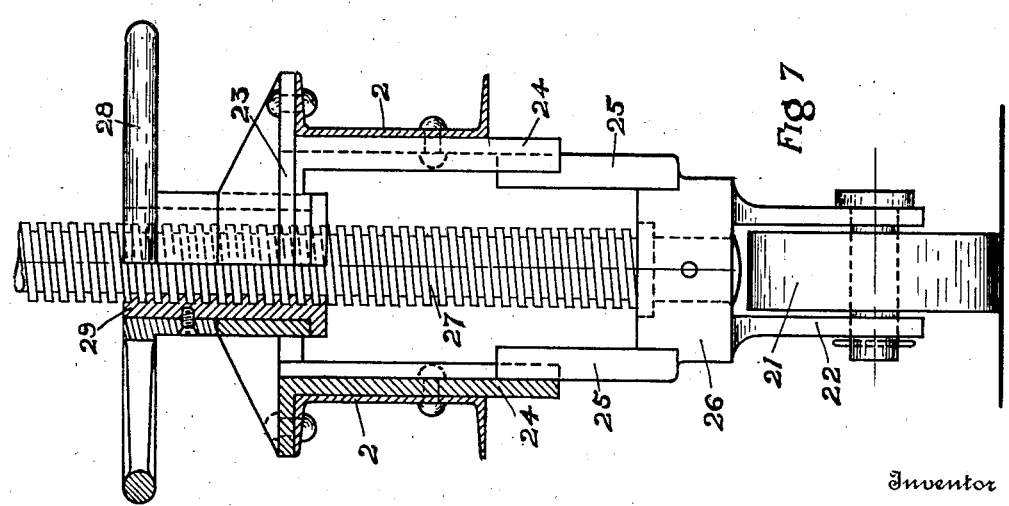

FRANK T. FALCO, OF SEATTLE, WASHINGTON, ASSIGNOR TO PACIFIC CAR & FOUNDRY CO., OF SEATTLE, WASHINGTON, A CORPORATION OF WASHINGTON.

TWO-WHEELED TRAILER.

1,400,351.  Specification of Letters Patent.  Patented Dec. 13, 1921.

Application filed March 31, 1919. Serial No. 286,516.

*To all whom it may concern:*

Be it known that I, FRANK T. FALCO, a citizen of the United States, and resident of the city of Seattle, county of King, State of Washington, have invented certain new and useful Improvements in Two-Wheeled Trailers, of which the following is a specification.

My invention relates to trailers and to the manner of connecting them with the hauling truck. The object of my invention is to provide a type of two wheeled trailer which may be readily connected to and disconnected from a truck, whereby one truck may be used in connection with a plurality of trailers, this making it possible to load the trailers without having to detain the trucks while this is being done.

Another object of my invention is to provide means for connecting the trucks and trailers such that the loading capacity of the truck is in no way reduced by reason of this.

A further object of my invention is to provide means such that a trailer may be supported independently of the truck while being loaded and unloaded, and such that the elevation of the connecting member of the trailer may be adjusted relative to the elevation of the complemental connecting member of the truck.

Further objects of my invention will appear from a study of the specification and accompanying drawings.

The features of my invention which I deem to be novel and upon which I wish to obtain letters patent will be hereinafter described and then particularly pointed out in the claims.

In the accompanying drawings I have shown my invention embodied in the form of construction which is now most preferred by me.

Figure 1 is a plan view of a trailer constructed in accordance with my invention and the rear end of a truck also provided with the special means required for operation in conjunction with the trailer.

Fig. 2 is a side elevation of the trailer and truck such as is shown in Fig. 1.

Fig. 3 is a top plan view and Fig 4 a central longitudinal section in elevation, showing the draft connections between the truck and the trailer.

Fig. 5 is a transverse section through the guiding frame carried by the truck, through which the draft connection for the trailer is secured, the same being upon the plane shown by the broken line 5—5 of Fig. 3.

Fig. 6 is a similar transverse section taken through the block which carries the king bolt, the same being upon the plane of the broken line 6—6 of Fig. 3.

Fig. 7 is an elevation, with portions in section, of the mechanism for supporting the third wheel of the trailer, the same being intended for supporting the front end of the trailer while disconnected from the truck.

One of the purposes of my present invention is to provide a trailer and a means of connecting the same to and hauling it by a truck, such that the truck may be used in much the same way as an ordinary truck and also to function after the matter of a locomotive on a railroad, namely, as a movable power plant which may be used for hauling a car or cars behind it, and which may be disconnected from these whenever desired. I have, therefore, designed the trailers in such manner and provided such means for connecting them with the trucks, that they may be supported independently of the truck for loading and unloading, and readily connected to and disconnected from the trucks, while at the same time the truck may be used as an independent source of carrying freight without this being affected in any way by the use of the trailer.

The type of trailer illustrated, and which will be described, is one having a low hung platform. It is evident, however, that the principles of my invention would apply with equal force, whether the platform was of the low character herein illustrated, or whether the platform was carried at a higher level.

The trailer illustrated has its platform 1 provided with a section 10, between the wheels, which is carried as low as construction features will readily permit. The width of this section of the platform is limited by the space between the wheels. Forward of the wheels it is provided with a section 11 which is of greater width and which extends to a point somewhat outside of the limits of the wheels. The platform is also shown as provided with stake pockets 12 and stakes 13. The minor features are, however, not of the essence of my invention, but are desirable for handling certain kinds of freight.

As the manner of constructing the trailer is, to a considerable extent, immaterial to my invention, I will not attempt to describe the same in detail except as it has a direct bearing upon the invention. The trailer is provided with a forwardly extending beam 2, which is of the nature of a rigid tongue. This is located centrally of the trailer and extends forwardly a sufficient distance to enable it to be connected with the truck after the manner which will be described.

The forward end of this tongue and the rear portion of the truck chassis, are provided with complemental connecting means of such character that the two may be readily connected and disconnected. The means carried by the truck comprises a king bolt 3 and a draft pin 4, by means of which the trailer tongue may be readily connected to and disconnected from the king bolt. For this purpose the king bolt is provided with an eye 30 upon its lower end.

To provide suitable support for this king bolt at the proper place, I have employed beams 5 which extend transversely across the chassis and which are secured to the longitudinal beams of the chassis. To these transverse beams 5 are secured short beams 50 which extend lengthwise of the truck. These two beams 50 are parallel with each other and spaced apart a suitable distance to receive the draft connecting members. By reference to Figs. 1 and 2, it will be seen that the members above described are so placed that the king bolt, when mounted thereon, will be carried rearwardly of the axle of the truck at a point which is substantially even with the rear edges of the truck wheels 60.

As illustrated, the king bolt is slightly to the rear of the rear line of the wheels, and this position is desirable where it is desired to be able to turn the truck into a position where its axis is at right angles with the axis of the trailer. In Fig. 1 I have shown, by dotted lines, a truck turned into a position making a considerable angle with the axis of the trailer, but yet not a complete right angle. This complete right angle may be attained if the position of the king bolt is rearwardly of the rear edges of the truck wheels an amount at least equal to half of the width of the tongue 2, and if this tongue is of sufficient length that the front end of the platform 1 is distant from the king bolt a distance equal to more than half of the width of the truck.

The front end of the tongue 2 is provided with two plates 20 which extend upwardly therefrom so as to form ears or arms. These are provided with holes adapted to receive the draft pin 4. The eye 30 in the lower end of the king pin is made so that the draft pin may have a small amount of rocking movement therein. As the king pin is mounted in the block 31 so that it may turn about a vertical axis, the connection of the truck and trailer is such that universal pivotal movement is secured. It is desirable that the tongue member 2 of the trailer be carried at a level sufficiently beneath the chassis of the truck that there will be no danger at any time of the extreme rear end of this chassis interfering with the tongue. This could occur only when the front end of the truck was relatively much elevated above the common plane of the rear wheel of the truck and the trailer wheels.

The king pin 3 is carried in a block 31, which is mounted to slide upon guides carried by beams or plates 50. This is shown as being secured by providing a groove in each of the two side faces of the block 31, which fits over guide blocks 51 secured to the inner surfaces of the beams 50. The block 31 is so connected with a draft spring 8, that the draft connection between the truck and the trailer is thus provided with a resilient member which will absorb the shocks of starting and stopping.

Two follower plates 80 and 85 are mounted between the beams 50 so as to have a limited sliding movement lengthwise of the beams 50. These plates are shown as held in place by means of angle plates 82 at their upper sides and flat plates 83 at their lower sides, between which they are free to move.

The spring 8 is placed between the two follower plates 80 and 85, and is held in position by fitting over bosses 81 carried by the inner surfaces of the follower plates. The follower plates are connected with the block 31 which carries the king bolt, by means of bolts 87 which pass through all three of these members. The follower plate 80 is prevented from moving toward the king bolt, beyond a certain point, by contact with the ends of the guide bars 51. The follower plate 85 is prevented from moving away from the king bolt beyond a certain point by engaging with blocks 86, secured to the inner side of the beams 50.

A strain placed upon the king bolt in a rearward direction will cause the forward follower plate 80 to move backward and compress the spring 8. A strain upon the king bolt acting in the opposite direction will cause the rear follower plate 85 to be moved forwardly, thus compressing the spring. These follower plates 80 and 85, are held by the stops against moving away from the opposite plate, but are free to move toward each other, to whatever extent is permitted by the spring. By this expedient the shock of starting and stopping the load is relieved. The device which is shown in detail in Fig. 7 is intended as a temporary support for the forward end of the trailer, when it is not connected with the truck. This consists of a caster wheel 21, which is mounted upon the rear portion of the tongue or arm 2. This wheel is journaled in a yoke 22, which yoke is supported so as to be vertically movable, for a purpose which will be described. The arm or tongue 2 has secured thereto a casting 23 which has arms 24 extending downwardly and provided with guideways, between which are mounted to slide, the upwardly extending arms 25, which are connected to, or form a part of, the base of the yoke 22. This base 26 has secured thereto a threaded shaft 27. A wheel 28 has a hub which is threaded and turns relative to the shaft 27. As herein shown this is secured by means of a sleeve 29, which is secured to turn with the hub of the wheel. This sleeve extends through a bearing in the casting 23. By this expedient the wheel 21 is supported in such manner that it may be raised and lowered. When the trailer is standing by itself this wheel would be lowered into a position corresponding with the dotted line position shown in Fig. 2. It may then be loaded or unloaded while separated from the truck. When it is desired to connect it with the truck the elevation of the plates 20 which carry the draft pin 4 may be adjusted as necessary in order to connect with the eye 30 of the king bolt. This elevation is apt to vary, both with the conditions of the ground surface and with the fact as to whether the truck is or is not loaded. The elevation of the tongue 2 may, however, be adjusted to correspond.

When the trailer has been connected up with the truck, the wheel 28 is turned so as to raise the wheel 21 sufficiently to insure a satisfactory clearance of the ground surface. In the position shown by full lines in Fig. 2 the wheel has been raised to approximately its maximum elevation. This wheel 21 is not intended for use when moving the trailer. It is merely a convenient means for supporting the forward end of the trailer while the same is disconnected from the truck. It is, however, possible to use it for moving the trailer as may be necessary for adjustments of position, and for short distances. Properly speaking, it is however not intended to be used while the trailer is under motion.

The plan of hitching the trailer to the chassis of the truck from beneath, such as has been illustrated and described, leaves the surface of the truck free for carrying a load. Its use as a truck is therefore in no wise interfered with by the attachment of the trailer thereto. In consequence a load may be placed upon the trailer which is destined for one point and a load upon the truck destined for another point, and the trailer may be left for unloading while the truck proceeds to the other point. This plan is a flexible plan which lends itself readily to handling a great variety of goods under widely varying conditions. While the plan is adaptable to trailers having a high load carrying platform it is especially well adapted to trailers having a low freight carrying platform such as the one herein illustrated.

What I claim as my invention is:

1. A truck and trailer combination comprising a truck having a draft block spring mounted upon the chassis to have fore and aft movement, a king pin carried by and depending from below said draft block, a horizontal draft pin carried by the lower end of the king pin, a trailer having a rigid tongue adapted to pass under the truck chassis and of a length equal to half the gage of the truck wheels and provided with ears adapted to engage with said draft pin.

2. A means for connecting a truck and a trailer comprising centrally placed guides located upon the rear part of the chassis, a draft block mounted upon said guides, substantially opposite the rear edges of the truck wheels, a king pin mounted in said block, a spring and follower blocks mounted in said guides and connected with the draft block, and a draft arm carried by the trailer and adapted to extend under the truck chassis and connect with the king pin.

3. The combination with a truck having a king bolt carried by and depending from the chassis forwardly of its rear end and rearwardly of the rear edges of the truck wheels, a trailer having a draft beam extending forwardly from its platform an amount at least equal to half the gage of the truck and provided at its forward end with means for engagement with the king bolt, whereby the truck and trailer may assume positions at substantially right angles to each other.

Signed at Seattle, Washington, this 22d day of March, 1919.

FRANK T. FALCO.